(12) United States Patent
Bayart et al.

(10) Patent No.: US 10,903,869 B2
(45) Date of Patent: Jan. 26, 2021

(54) TERMINAL ENABLING FULL-DUPLEX VOCAL COMMUNICATION OR DATA COMMUNICATION ON AN AUTONOMOUS NETWORK SIMULTANEOUSLY WITH A DIRECT CONNECTION WITH OTHER COMMUNICATION MEANS ON OTHER NETWORKS

(71) Applicant: APPI-TECHNOLOGY SAS, Nîmes (FR)

(72) Inventors: Laurent Bayart, Nîmes (FR); Julien Chaix, Nîmes (FR); Denis Coulon, Nîmes (FR); Michael Marin, Nîmes (FR)

(73) Assignee: APPI-TECHNOLOGY SAS, Nîmes (FR)

( * ) Notice: Subject to any disclaimer, the term of this patent is extended or adjusted under 35 U.S.C. 154(b) by 26 days.

(21) Appl. No.: 16/481,640

(22) PCT Filed: Jan. 30, 2018

(86) PCT No.: PCT/FR2018/050216
§ 371 (c)(1),
(2) Date: Jul. 29, 2019

(87) PCT Pub. No.: WO2018/138462
PCT Pub. Date: Aug. 2, 2018

(65) Prior Publication Data
US 2020/0014416 A1     Jan. 9, 2020

(30) Foreign Application Priority Data

Jan. 30, 2017 (FR) .................................. 17 50710
Jul. 18, 2017 (FR) .................................. 17 56790

(51) Int. Cl.
*H04M 1/00* (2006.01)
*H04B 1/403* (2015.01)
*H04B 1/3827* (2015.01)

(52) U.S. Cl.
CPC ............. *H04B 1/406* (2013.01); *H04B 1/385* (2013.01); *H04B 2001/3866* (2013.01)

(58) Field of Classification Search
CPC . H04B 1/406; H04B 1/385; H04B 2001/3866
(Continued)

(56) References Cited

U.S. PATENT DOCUMENTS 5,721,783 A * 2/1998 Anderson ............... H04B 1/385
381/328
6,134,223 A * 10/2000 Burke .................... H04N 7/148
348/14.08

(Continued)

FOREIGN PATENT DOCUMENTS

WO   WO-2012104725 A2 * 8/2012 ............ H04W 76/00
WO   WO-2015199704 A1 * 12/2015 ............. H04B 1/385

*Primary Examiner* — April G Gonzales

(74) *Attorney, Agent, or Firm* — Patshegen IP LLC; Moshe Pinchas (57) ABSTRACT

The portable communication terminal for communicating on at least two independent radio networks, comprises, in a single housing:

Communication means (47, 49) by time multiplexing on a single radio channel, TDMA type full-duplex, for audio communication in "conference" and "hands-free" mode on a first autonomous network without infrastructure, (Continued)

Access means (43, 50) for half-duplex audio communication on a second autonomous network, independent from the first full-duplex network, A connection to a microphone (41) and a speaker (52), A wireless connection for a cellular telephone network, At least one pushbutton (45) for switching the communication of the microphone and the loudspeaker to and from the communication on the first network, the second network or the cellular telephone network by means of electronic switching circuits and An electronic codec type audio signal mixer (42, 51) having a plurality of inputs and outputs, configured to mix half-duplex communications on the full-duplex local area network to provide to a user, via the microphone and the loudspeaker, simultaneous access to multiple audio communications on different networks, depending on the press on the push button.

18 Claims, 4 Drawing Sheets

(58) Field of Classification Search
 USPC ...................................................... 455/552.1
 See application file for complete search history.

(56) References Cited

U.S. PATENT DOCUMENTS

| | | | |
|---|---|---|---|
| 7,920,527 B2* | 4/2011 | Rakshani | H04W 4/18 370/335 |
| 9,996,314 B2* | 6/2018 | Sunstrum | H04W 4/10 |
| 2005/0131558 A1* | 6/2005 | Braithwaite | H04R 27/00 700/94 |
| 2006/0023649 A1* | 2/2006 | Tillet | H04W 76/20 370/310 |
| 2006/0025165 A1* | 2/2006 | Tillet | H04W 76/20 455/517 |
| 2007/0105579 A1* | 5/2007 | Shaffer | H04L 65/605 455/519 |
| 2008/0109095 A1* | 5/2008 | Braithwaite | H04L 67/10 700/94 |
| 2008/0146186 A1* | 6/2008 | Rofougaran | H04B 1/3833 455/333 |
| 2010/0303046 A1* | 12/2010 | Braithwaite | H04L 12/2838 370/338 |
| 2012/0135685 A1* | 5/2012 | Higgins | H04B 1/385 455/41.2 |
| 2012/0184331 A1* | 7/2012 | Rofougaran | H04M 1/253 455/556.1 |
| 2015/0120305 A1* | 4/2015 | Buck | G10L 25/48 704/275 |
| 2017/0192745 A1* | 7/2017 | Sunstrum | G06F 3/165 |
| 2017/0344121 A1* | 11/2017 | Blanco | H04M 1/7253 |

\* cited by examiner

TERMINAL ENABLING FULL-DUPLEX VOCAL COMMUNICATION OR DATA COMMUNICATION ON AN AUTONOMOUS NETWORK SIMULTANEOUSLY WITH A DIRECT CONNECTION WITH OTHER COMMUNICATION MEANS ON OTHER NETWORKS

TECHNICAL AREA

The present invention relates to a method, a terminal and a system for full-duplex voice communication or data on an autonomous network simultaneously to a direct connection with other means of communication on other networks.

It applies to the field of telecommunications and, more particularly, to telecommunications in a severe industrial environment, or to rescue or military teams.

STATE OF THE PRIOR ART

We know the phones Mobile cell that can be used with an audio headset or other equipment used as such to eventually connect on these systems to communicate in a hands-free mode.

We know other communication means known as PMR (acronym for "Private Mobile Radio" or private "mobile radio system" better known as "Walkie-Talkie", registered trademark) can be used with headsets eventually connected to these systems to communicate. These systems, given their technology of single emitter on a given frequency in a given time, are equipped with an integrated or external Push-To-Talk (PTT) which switches the system from the receiver mode to the transmitter mode.

We know another type of radio communication systems offering a wireless conference mode, including APPI-Com (trademark), systems described in PCT Application WO2013140070, which enables create an autonomous network of portable terminals transceivers for a "full-duplex" conversation mode or data communication. These systems allow multiple people to wirelessly communicate in conference mode using an audio headset connected to the system via a wired or wireless connection, Bluetooth connection for example, send and physio-chemical, physiological or environment data on the same autonomous network as indicated in the international Application PCT/FR2016/053166.

These three types of systems, if used by the same person, do not allow to be used simultaneously and with the same audio headset, unless by creating complex and cumbersome external connections (wired or wireless), using audio communications mixers or a fourth box or appliance, and specifically generate conflicts by summing up the audio signals making impossible an effective communication.

In addition, the use of PMR requires connecting "Push To Talk" (or "PTT") for switching the system from receiver to transmitter mode, PTT which itself often consists of a housing to be worn by the user, thus adding a fifth communication devices on top of an audio headset to connect to the different boxes or to the audio mixer.

Particularly known is the U.S. Pat. No. 8,705,377 which describes several modes of connection and mixing of these communications in particular for three types of networks (autonomous TDMA, cellular telephony, PMR) by combining in particular a portable TDMA (Time Division Multiple Access) type radio on a stand-alone network to another portable, long-range PMR type radio, by means of an external mixing signal box ("Signal compounder") to link the different devices using the different networks, an audio headset being connected to the signal mixer.

This patent, whose principles are already detailed in a previous patent application ("Systems and methods for providing push-to-talk to full-duplex voice internetworking" US 20070117581), describes different variants of the wired interconnection of several wired radio networks of an external mixer of signals to two portable radios, a technique accessible to any skilled person. This outer signal mixing box is also used as the network switch selector and transmission mean selector, including the PMR link requiring a PTT. So, this prior art does not solve the practical difficulties that reside in these interconnections, since it implies in particular the use of an external signal mixer for each of the two portable communication devices, and therefore requires the carriage of an additional box, both for the mixing of signals and for the speech procedure for the use of PMR type portable radio (PTT).

Moreover the management of the incoming communication flows is not instructed in these documents, nor its effective management which presents difficulties that the present invention does solve.

Document WO 2012/104725 discloses a terminal comprising a PMR communication system (which, by definition, is "half-duplex" and therefore does not allow conference mode with a multiple-speaking people) and a mobile cellular communication circuit to switch to telephone mode when the PMR communication is lost: the mobile then switches PMR mode to the mobile cellular mode deactivating the PMR mode, the objective being to use the cellular mobile network as a backup for PMR network when this one is no longer available (out of range for example). There is therefore only one audio communication, which passes primarily by the PMR network if it is available, or failing that by the mobile network.

SUMMARY OF THE INVENTION

The present invention aims to remedy all or part of these disadvantages.

For this purpose, the present invention aims at a communication terminal according to claim 1.

Thus, the user, with one only audio equipment (for example a headset with or without noise protection) connected to the terminal on a single connector can converse over several independent networks.

The terminal also makes it possible, in the same box, for the direct interconnection and the speaking on a PMR type network by manual or automatic action of a PTT integrated in the box or/and on another radio network, of type cellular mobile phone, for example. It applies, in particular, to the constitution of an autonomous radio communication network, multi-users, which includes both "audio conference", or "full-duplex" mode for a number of users, and long-distance communication on other radio networks without the need for any external communications mixing equipment. The applications concern the mobile teams of people who have to wirelessly communicate in "conference mode" between them while allowing communicate on other networks with people, more distant or not part of the same team, and using more conventional systems as a mobile phone, PMR or intercom.

The invention provides a significant improvement to the interconnections of various radio networks with a single portable housing system and all-in-one integrating both, according to its embodiments:

A radio creating a TDMA network without a base in conference mode,

A programmable user interface with a control screen for sending alert messages with a push button, A connector to an audio headset A connector for a vehicle intercom or one (or more) external radios for using the terminal of the invention as a PTT even without energy by the terminal of the invention (empty battery) by mixing analog signals (different inputs of an Encoder-Decoder), A push button (PTT-Duplex) allowing instantaneous or delayed triggering of the full-duplex radio source or the sending of predefined signals A second push button for triggering an external radio source, or sending predefined signals, A wireless link, Bluetooth type for example, enabling to connect several types of audio devices including outdoor Radio, cellphone, audio headset, or to connect environmental or physiological data sensors, A piezoelectric vibratory device of a buzzer type for broadcasting warning signals, A motion sensor triggering an immobility alert with an alert to the team members, A wireless link dedicated to the identification data or short messages, for example of the RFID, Sigfox, Lora type A programmable selector allowing, for example, the choice of radio channels or sources to listen, transmitters used or signals to be transmitted, A positioning circuitry using satellite or terrestrial positioning, A sound capture system and integrated sound reproduction in the housing to provide voice communication without external headset connection, A signal mixer from a variety of sources:
  an audio headset directly connected to the single box via a wired or wireless connection,
  an external radio connected in wired or wireless mode,
  a second internal radio or connected in wired or wireless mode; and/or A configurable audio and data flow management system allowing efficient use by a user communicating with several people in the team (INTRA communication), outside the team (External), or distant (PMR, Phone).

Thus, in embodiments, the portable communication-and-switching terminal is in a single box like a Multi-Radio-PTT type incorporating a wireless communication terminal using time-division multiplex radio communication without base on a single radio channel selectable in a frequency band for audio conferencing in "hands-free" mode on a standalone network between at least two users of identical or compatible devices, and integrating and/or allowing direct connection of other radio communication systems and audio connection and switching means.

This terminal, according to its embodiments:

Allows the use by a single person of a microphone and speakerphone type equipment (for example integrated into an audio headset) by connection (wired or wireless) for alternating or simultaneous voice communication on at least two different radio networks operating on different frequencies, Allows switching from one network to another by possible action on one or more selectors or pushbuttons, wired or wireless, or automatically by configuration, and/or mixing the reception or transmission signals from several audio or radio sources, Allows, even when not electrically powered, by a combination management of electrical status at rest (semiconductor relay type with virtually no resistance at rest), to function as a Push To Talk system (PTT) if an external PMR type radio is connected to it, The communication-and-switching system allows, thanks to internal sensors or connected by wire or wireless connection, to detect events or to measure physical-chemical values and to send data or warning signals to local or remote users, The communication-and-switching system makes it possible to operate the full-duplex radio part or simply to recharge its internal battery by taking energy from the connected PMR radio and/or The communication-and-switching system manages the communication flows so as to make the communication flow smooth despite the incoming signals from several sources by the set of pushbuttons and a programmable settings of the mixing of the input and output signals with prioritization, attenuations, delay or restoration of audio signals.

Preferably, this terminal is directly integrated in communication-and-switching-PTT box connected to an audio device, allowing either full-duplex audio and data communication without any user intervention once the communication is established, either by action on one or several push buttons or automatically, the remote communication by at least one other mean of radio communication (for example, PMR, mobile phone, vehicle intercom), internal or connected by a wired or wireless connection.

In embodiments, the terminal that is the subject of the invention comprises at least one multiplexer for, even when it is not powered electrically, by a combination management of electrical states at rest of at least one multiplexer, operate as a system of alternates ("PTT") if an external PMR type radio is connected to it.

In embodiments, the terminal that is the subject of the invention comprises means for sound signaling the cutoff and/or the establishment of synchronization data communication between said terminal and a peer terminal.

In embodiments, the terminal object of the invention comprises a sound signaling means of the cutoff and/or the establishment of a communication between a peer terminal, a microphone and a loudspeaker of the peer terminal.

In embodiments, the terminal is in the operating mode called "SafeLine". In this mode of operation, the radio link between each of the terminals is controlled by the reception level of each terminals and the good reception of the synchronization data (since there is no speech data). In addition, the terminal is able to detect whether a microphone and a speaker, for example a wired or non-wired headset, is connected by two specific means:

Wired case: the connection from the terminal to the headset comprises a wire with specific resistance according to the Audio headset type to validate its presence and detects its eventual disconnection by a measurement circuit of the voltage across the two conductors (go-return). If the headset is disconnected, the terminal detects it.

Wireless (Bluetooth) case: the Bluetooth link is detected by the communications protocol itself. The loss of the Bluetooth headset (for example, no more battery, power-off, out of range) is detected by the terminal.

Third parties are informed of who is on-line by a voice message, in addition to a pictogram appearing on the terminal control screen, which indicates that another person is connected: for example the user of terminal "A" present in a group of three interconnected terminals, hears "Terminal B connected" and "Terminal C connected".

At a regular time interval (configurable by configuration), the terminal checks that users B and C are still connected. Otherwise, it plays the corresponding voice message ("Terminal X disconnected").

In embodiments, the terminal object of the invention comprises a means of recharging an internal battery by taking energy from a PMR type radio connected to it.

In embodiments, the terminal that is the subject of the invention comprises means for mixing input and output signals with prioritization, attenuation, delay or restoration of the audio signals.

The audio signals from these different sources are parametrically mixed using a Codec component built into the terminal.

In embodiments, the terminal object of the invention comprises a codec providing functions of pre-amplification, audio mixing, audio multiplexing, and digitization of signals, filtering and post-amplification.

With multiplexers, the codec performs the processing of incoming and outgoing audio signals, microphone and loudspeaker, external radio and internal audio data from digital processing for full-duplex communication, with and without an electrical source.

Thus, each audio source can be activated, amplified, attenuated or cut, as input (what the user says in the microphone) that output (what is played in the speaker).

In embodiments, the terminal object of the invention comprises at least one PMR type external radio input and a cellular telephone input.

In embodiments, the terminal object of the invention comprises a priority setting means configured to give a different priority for each of the different types of communication.

The operational use of the terminal depends on the modes and choice of communication of the users $_{[LB1]}$ to define the best options, especially in complex cases of simultaneous communications, for "intervention chief", with more than one interlocutor. The terminal therefore includes mechanisms allowing the user to use all of these networks in an optimal manner, in particular according to the priorities of the messages to be processed, as well as the operational needs of the user.

Different typologies of voice communication needs are:
1. Vocal full-duplex hands-free TDMA (named "APPI") between the team members
2. Vocal half-duplex PMR (named "WT")
3. Vocal full-duplex with a cell phone (named "GSM", acronym for Global System for Mobile Communications
4. Vocal with the surrounding people nearby (named "EXT")

In order to make all of these networks and environments to coexist, a priority (configurable) is given to each communication mode. To avoid complex manipulations (and potentially error-prone) of configuration of the terminal in the field by the operators, this configuration of the priorities is made using a configuration software on a computer or tablet usable when the device is connected via its wired USB connection and placed in wired configuration mode. Thus, only the team leader, who is provided with the configuration software, is able to define these priorities according to the communication protocols in line with the missions performed by the team members.

For example, we define:
Highest priority: WT network,
Intermediate priority: GSM network and
Lowest priority: APPI network.

Thus, the switching or mixing of the different networks is automatically applied according to these priorities. According to the example of the above priorities, if for example a communication is established on the WT network, the GSM network is cut off the time of this communication and then re-established at the end of WT communication.

In embodiments, the terminal that is the subject of the invention comprises attenuation means, in each loudspeaker, of sound signals coming from a lower priority communication when a sound signal of a higher priority communication is received and broadcasted in each speaker.

For example, in the case of receiving a signal from the WT network while in APPI communication, the user of the terminal hears the incoming WT message which is mixed by the Codec-type electronic circuitry to the APPI network signal, the latter being attenuated by a programmable value and the audio result is sent to the speaker (for example an audio headset). Thus, the message of the WT network, considered as a priority, is heard more strongly by the user.

In embodiments, the terminal subject of the invention comprises a sound signaling means of the cut-off of the listening of a less priority communication in progress between said terminal and a peer terminal when the peer terminal receives a higher priority communication, while maintaining the connection and synchronization between terminals.

For example, in WT dialog mode, the wearer of the terminal decides to speak on the WT network by pressing a second PTT push button of the terminal. In this case, it no longer hears the other members of the APPI network (cutoff of the corresponding output at the Codec), they no longer hear him (cut the corresponding entry at the Codec) and are warned by a signal and/or message of the temporary disconnection of the wearer. Nevertheless, the terminal remains connected and synchronized to the APPI network, in order to stay tuned for any priority alert message sent by another user of this network. Only the audio streams are thus suspended.

In embodiments, the terminal that is the subject of the invention comprises a means of detecting the end of communication with higher priority and of restoring a less priority communication.

At the end of his speech, a first programmable delay time (for example three seconds, this time being defined using a computer or tablet setting software that can be used when the terminal is connected via the USB connection and placed in USB configuration mode) allows the wearer of the terminal to wait for the possible answer from the remote correspondent on WT, without hearing the communication of members of the APPI network. At the end of this delay, the APPI network is reactivated automatically since the communication on the WT is considered complete. If the remote interlocutor WT responds during the delay time, the terminal remains disconnected from the APPI network during its response, plus a second time delay (four seconds for example) to allow for a new response. Thus, as long as the WT dialogue continues through this alternation of transmissions/reception, the APPI network remains deactivated at the audio level.

In embodiments, the terminal object of the invention comprises means for retransmitting signals from one network to another.

Thus, the audio signal received from the WT network can be sent back to the other members of the APPI network by means of a Codec audio electronic mixer (not shown) so that the other members of the APPI network participate in the conversation between the wearer and his remote interlocutor from the WT network. In this operating mode, the inputs and outputs of the Codec corresponding to the APPI network are not disconnected or cut off.

In embodiments, the terminal object of the invention comprises means for receiving an alert signal, said alert signal being broadcast by each speaker, regardless of the terminal status and the priority level of ongoing communications.

Thus, in case we choose to relay the APPI network to the external module (GSM or PMR), the inputs and outputs of the Codec corresponding to the APPI network are not disconnected or cut off. To ensure the security of members of the APPI network including during phases when a member is disconnected from the network because in communication on the WT or GSM network, the terminal has a push button (not shown) for sending via the APPI network an alert signal. When a terminal receives such an alert signal, whether or not it is disconnected at the audio level of the APPI network, this terminal broadcasts an audio alert message in the speaker of the wearer, this message being generated by an electronic circuitry (not shown) via the Codec.

In embodiments, the terminal object of the invention comprises an access to at least one internal sensor or connected by wire or wireless connection, for detecting events or measuring physical-chemical values, at least one means of communication being configured to send data or alert signals to other terminals, based on events or captured measurements.

In embodiments, the terminal includes an audio headset having the microphone and the speaker.

In embodiments, the terminal object of the invention is included in a PMR.

In embodiments, the terminal object of the invention comprises a connector for connection to an external PMR.

BRIEF PRESENTATION OF FIGURES

Other advantages, objects and features of the invention emerge from the description which follows, given for explanatory purposes and in no way limiting to the appended drawings, in which.

DESCRIPTION OF AT LEAST ONE EMBODIMENT OF THE INVENTION

Figure 2:
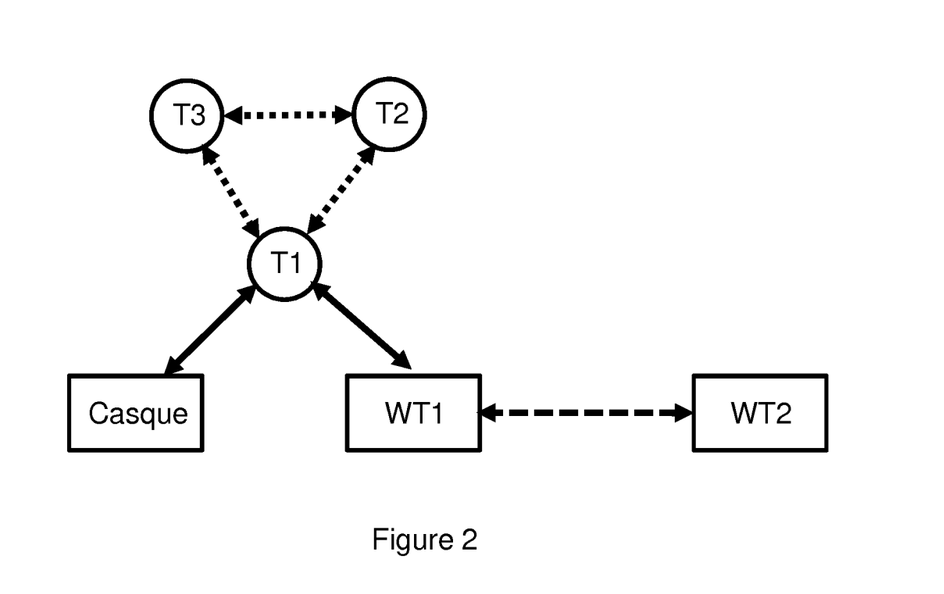
FIG. 2 represents, schematically, a telecommunication network comprising several terminals that are the subject of the invention.

The general case of using at least two radio networks for a crew member is detailed in FIG. 2, in which:
 T1, T2 and T3 are terminals of the invention that establish a full-duplex communication between them,
 T1 is connected in audio mode to WT1, a PMR type communication device establishing half-duplex communication with at least one other WT2 PMR on a standalone network independent of the full-duplex network
 T1 is connected to a microphone and a speaker, considered in the following description as integrated into a headset, this headphone being worn by the user of the terminal T1.

The invention aims at a portable communication-and-switching terminal in a single box of a Multi-Radio-PTT type incorporating, in a preferred embodiment:
 A Full-Duplex TDMA radio-based wireless communication terminal for audio conferencing in "conference" and "hands-free" mode on a single channel of an autonomous network between at least two carriers of homologous or compatible devices,
 A wired connection enabling other WT type radio communication systems to be directly connected to it,
 A connection (wired or wireless type Bluetooth for example) for a headphone (audio headset) type equipment,
 A wireless connection (Bluetooth type for example) for a cellular phone,
 At least one push button enabling the audio headset to be connected to the WT by switching the audio signals by means of electronic switching circuits,
 At least one switch for selecting the listening and speaking modes by means of the headphones to the audio sources resulting from the various connections and
 An electronic mixer of Codec type for audio signals comprising several inputs and outputs.

Figure 4:
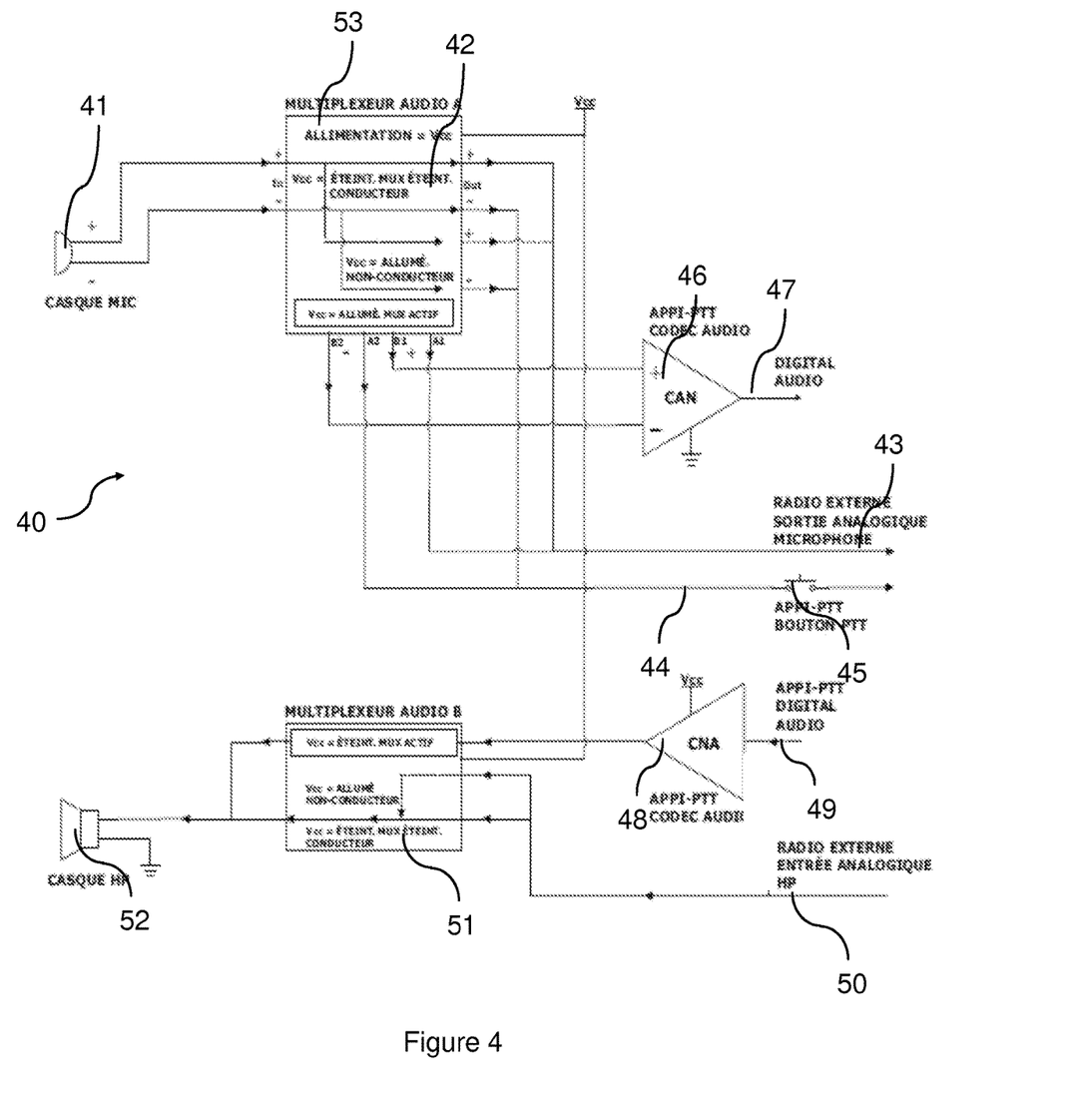

The terminal allows, even when not powered electrically, by a combination management of electrical states at rest of the multiplexers to act as a PTT system if an external radio type PMR is connected as indicated in FIG. 4, described below.

The terminal also allows, through internal sensors connected by wire or wireless connection, to detect events or to measure physical-chemical values and to send data or warning signals to local or remote users.

The terminal also makes it possible to operate the full-duplex radio part or simply to recharge its internal battery by taking energy from the PMR radio connected to it.

The terminal also makes it possible to manage the communication flows in such a way as to make the communication flow smooth despite incoming signals from several sources by the set of pushbuttons and a programmable mixing management of the input and output signals with prioritization, attenuation, delay or restoring of audio signals.

Figure 5:
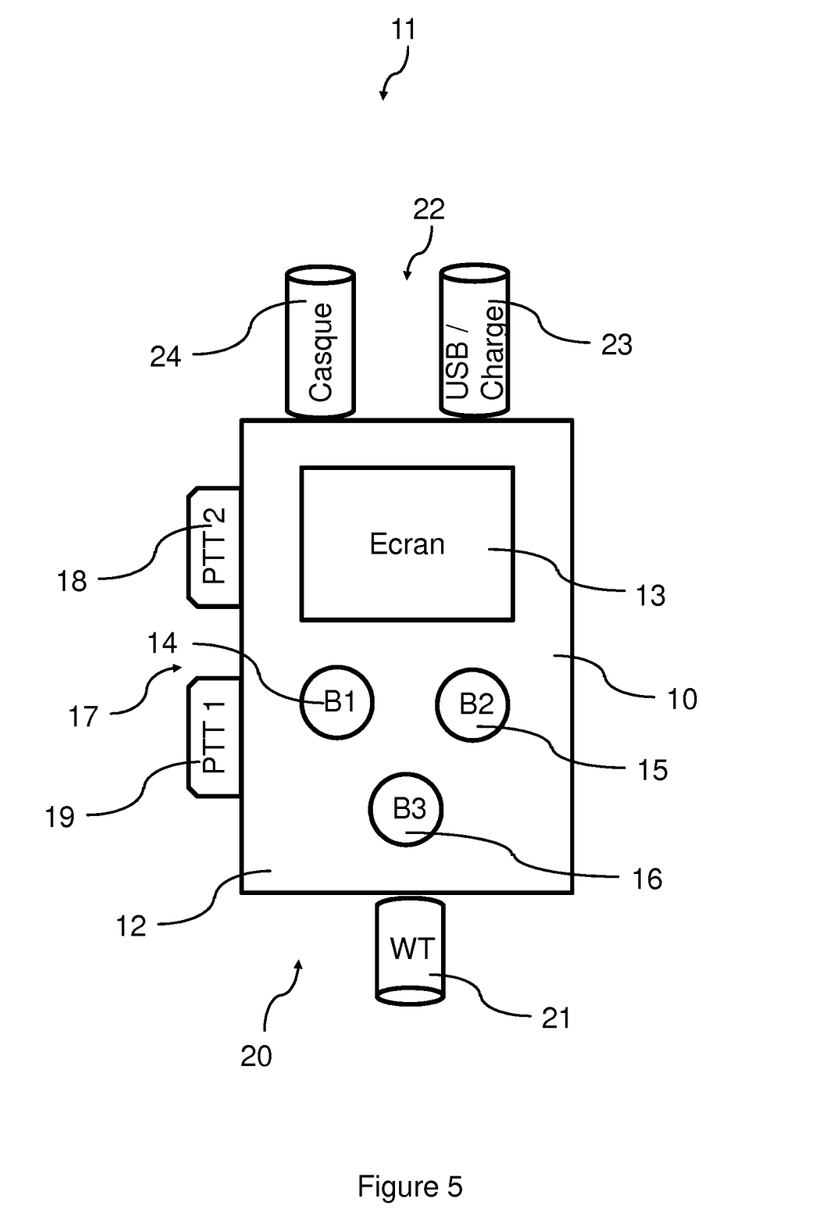
FIG. 5 represents a box of particular embodiments of the terminal that is the subject of the invention.

As illustrated in FIG. 5, a housing 10 of a particular embodiment of a terminal 11 subject of the invention comprises, on a front 12, a screen 13 displaying configuration information (e.g., communication channel, operating mode, volume level, visual indication of the battery level in addition to the vocal indication) and three buttons 14, 15 and 16 the user can press to interact with the terminal 11. These interactions concern, e.g.:

Stopping/starting the terminal 1,
Accessing to the different menus of change of communication channel,
Setting the sound volume,
Enabling or configuring features.

The housing 10 also comprises, on one side 17, two buttons 18 and 19 whose actions are described below. The housing 10 also comprises, on another side 20, a connector 21 for connecting to the terminal 11 an external radio of type PMR and/or a mobile phone (not shown). The housing 10 includes, in addition, on another side 22, a connector 23 for connecting to the terminal 11 a charger whose interface is of the USB type (acronym for Universal Serial Bus). This connector 23 allows both charging the battery, and the use of the data communication in serial mode if a computer or a tablet is connected to it.

This exchange of data in serial port allows, via a software application on the computer or the tablet, to program/configure the operation of the terminal 11. Finally, the housing 10 has, on the side 22, a connector 24 for connecting an audio headset having a microphone and one or more speakers. In embodiments, the connectors 23 and 24 are merged into a single connector with more connection points. The housing 10 also has on its rear face (not shown), a fastening clip for hanging on a garment or a belt of the wearer, which ensures the possibility of using the hands-free system.

Figure 1:
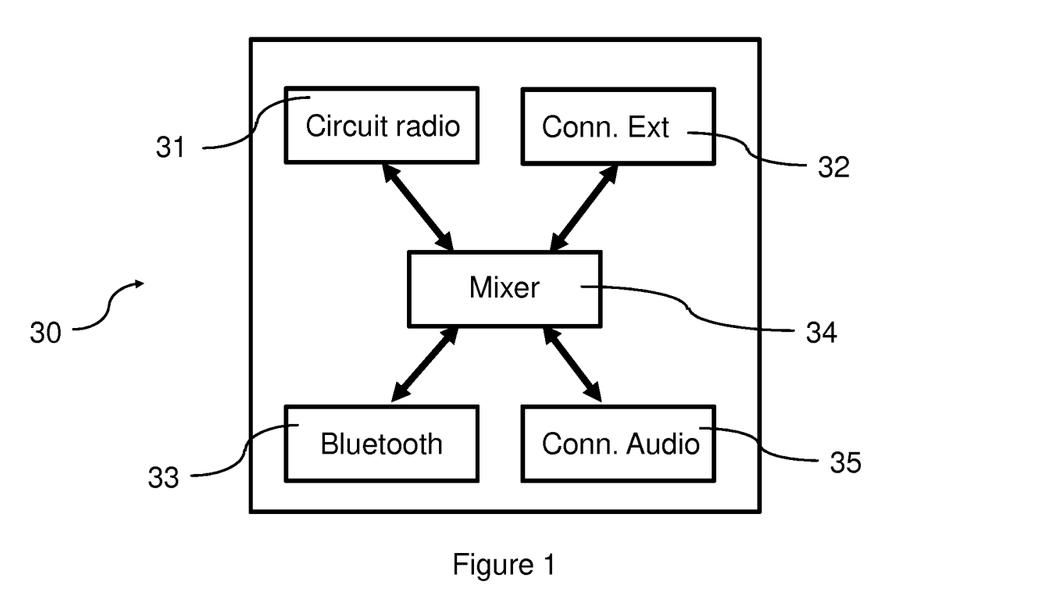
FIG. 1 represents, schematically, a particular embodiment of the terminal that is the subject of the invention.

As illustrated in FIG. 1, one embodiment of the device 30 object of the invention comprises a radio frequency transmitter/receiver 31 to set a standalone/autonomous network hands-free and full-duplex without base used both for voice transmission in conference mode but also for the transmission of data or alerts. The terminal 30 comprises, moreover, a connector 32 for a direct connection wired with other communication networks, and a Bluetooth transmitter/receiver 33. The terminal 30 thus makes it possible to connect a PMR wired link (Ext Conn.) or Bluetooth, and/or also a mobile phone by wired connection or Bluetooth.

Thus, the user, with one and the same audio equipment (headphones with or without hearing protection) connected to the terminal 30 on a connector 35, is able to converse through several independent networks.

The audio signals from these different sources are mixed in a configured mode using a codec component 34 integrated in the terminal.

FIG. 4 shows a codec 40, for connecting a headset microphone 41, and which includes a multiplexer 42 having an output 43 for an analog audio signal and an output 44 on a contactor 45 (PPT2) to be squeezed for speaking. The multiplexer 42 is also followed by an analog-to-digital converter 46 provided with a digital output 47 for transmission over the full-duplex digital radio network. In parallel, the codec 40 comprises an analog digital transceiver 48 receiving a digital radio signal 49. An analog radio signal 50 and the analog signal from the analog digital converter 48 are supplied to a multiplexer 51, itself followed by at least a headphone speaker 52.

As illustrated in FIG. 4, when a power source 53 powers the codec 40, it provides the functions of pre-amplification, audio mixing, audio multiplexing, signal digitization, filtering and post-amplification. With the multiplexers 42 and 51, the codec 40 performs the processing of the incoming and outgoing audio signals, the headphones, the external radio and the internal audio data resulting from the digital processing for the full-duplex communication, with and without an electrical supply.

Thus, each audio source can be activated, amplified, attenuated or cut, as input (what the user says in the microphone 41) that output (what is played in the speaker 51).

Nevertheless, the operational use of the terminal depends on the modes and choice of communication of the team members to define the best options, especially in the complex cases of simultaneous communications, for the intervention "leader", with more than one interlocutor. The terminal thus includes mechanisms allowing the user to use all of these networks optimally, in particular according to the priorities of the messages to be processed, as well as the operational needs of the user.

The different typologies of voice communication needs are:
1. Voice full—duplex hands-free TDMA (named "APPI") between team mates
2. Voice half-duplex PMR (named "WT")
3. Vocal full-duplex with a cell phone (named "GSM", acronym for Global System for Mobile Communications)
4. Vocal with the surrounding people nearby (named "EXT")

In order to make all of these networks and environments to coexist, a priority (configurable) is given to each communication mode. To avoid complex manipulations (and potentially error-prone) or configuration of the terminal in the field by the operators, this configuration of the priorities is made using a configuration software on a computer or tablet usable when the device is connected via its wired USB connection and placed in wired configuration mode. Thus, only the team leader, who is provided with the configuration software, is able to define these priorities according to the communication protocols in line with the missions performed by the team members.

For example, we define:
Highest priority: WT network,
Intermediate priority: GSM network and
Lowest priority: APPI network.

Thus, the switching or mixing of the different networks is automatically applied according to these priorities. According to the example of the above priorities, if for example a communication is established on the WT network, the GSM network is cut off the time of this communication and then re-established at the end of WT communication.

The various cases of activation/mixing different networks are described after.

Case 1: Full duplex TDMA network communication ("APPI") only. In this case, the user is connected in full duplex with other wearers of equivalent terminals and dialogue with them in hands-free mode. If he wants to temporarily transmit what he says to the EXT environment, he can use the PTT 1 push button on the terminal to mute his/her microphone and/or switch it to PTT (Push-to-talk) mode. Thus, by pressing this button PTT 1, the user can choose to work hands-free or on demand on the APPI network.

Case 2: Receiving a signal from the WT network while in APPI communication. The wearer of the terminal hears the incoming message of the WT which is mixed by the electronic circuit type Codec APPI network signal, the latter being attenuated by a programmable value and the whole sound is sent to the audio headphone. Thus, the message of the WT network, considered as a priority, is heard more strongly by the wearer.

Case 3: WT dialog mode. The wearer of the terminal decides to speak on the WT network by pressing the second push button PTT 2 of the terminal. In this case, he no longer hears the other members of the APPI network (cutoff of the corresponding output at the Codec), they no longer hear him (cut the corresponding entry at the Codec) and are warned by a signal and/or message of the temporary disconnection of the carrier. Nevertheless, the terminal remains connected and synchronized to the APPI network, in order to stay tuned for a possible priority alert message sent by another user of this network. Only the audio streams are thus suspended or cut.

At the end of his conversation, a first programmable time delay (for example three seconds, this time being defined using a setting software on a computer or tablet that can be used when the terminal is connected via the USB connection in USB configuration mode) allows the wearer of the terminal to wait for the possible answer from the remote correspondent on WT, without hearing the communication of the members of the APPI network. At the end of this delay, the APPI network is reactivated automatically since the communication on the WT is considered complete.

If the remote interlocutor WT responds during the time delay, the user remains disconnected from APPI network during its response, plus a second time delay (four seconds for example) to respond again. Thus, as the WT dialogue continues in this alternating emission/reception, the APPI network remains off on the audio side.

According to another configuration mode of the terminal that is the subject of the invention, the audio signal received from the WT network can be sent back to the other members of the APPI network by means of a Codec-type electronic audio mixer (not shown) so that the other members of the APPI network participate in the conversation between the wearer and his remote interlocutor of the WT network. In this mode of operation, the inputs and outputs of codec corresponding to APPI network are not disconnected or cut.

Case 4: Receiving a signal from the network while in APPI communication. The terminal wearer hears the call signal from the phone, emitted in the Audio headphones and generated by a Codec type of electronic circuitry and chooses or not to respond.

If the wearer chooses to respond, he will exclude himself from the network APPI communication by accepting the incoming call either through his Telephone (Pickup) or by pressing the PTT 2 button (terminal relaying this decision phone call via the Bluetooth protocol). In this case, he no longer hears the other members of the APPI network and they are warned by a signal of temporary disconnection of the wearer. Nevertheless, the device remains connected and synchronized to APPI network, in order to stay tuned for a possible priority alert message sent by another user of the network. Only the audio streams are thus suspended or cut. From the end of its communication telephone, the communication with the other members of APPI network is automatically reactivated.

According to another configuration mode, the audio signal received from the GSM network is sent back to the other members of the APPI network by means of a Codec audio electronic mixer (not shown) so that the other members of the APPI network participate to the conversation between the wearer and his remote interlocutor of the GSM network. This configuration is defined using a computer or tablet configuration software that can be used when the terminal is connected via the USB connection and used in USB configuration mode.

In other embodiments, the choice to relay or cut the APPI network can be done by pressing the PTT button 1.

In the case where one chooses to relay the APPI network to the external module (GSM or PMR telephone), the inputs and outputs of the Codec corresponding to the APPI network are not disconnected or cut off.

To ensure the safety of members of the APPI network including during phases when a member is disconnected from the network because in communication on the WT or GSM network, the terminal has a button (not shown) for sending via the APPI network an alert signal. When a terminal receives such an alert signal, whether or not it is disconnected at the audio level of the APPI network, this terminal broadcasts an alert audio message in the speaker of the wearer, this message being generated by a circuit electronics (not shown) via the Codec.

The terminal can also embark integrated sensors (accelerometer for example) to detect the immobility of the wearer. Thus, on the same principle as sending a voluntary alert by pressing the button of the terminal described above, the terminal can automatically send an immobility alert to members of the APPI network as soon as it detects immobility of the wearer.

The terminal can also use its Bluetooth transceiver (or any equivalent technology) to be connected to a sensor (not shown) for heart rate measurement, bottle gas pressure, body temperature, environmental temperature, temperature and gases or potentially hazardous atmospheres (e.g. CMOS sensors for H2, CO, CO2, NOx). The terminal can then transmit the information from these sensors to the wearer, as well as to other terminals connected via the APPI network. The terminal can also trigger alerts according to the values read on these sensors, the triggering conditions of the alerts being configurable.

The terminal may also comprise a "buzzer" type of vibrating piezoelectric device (not shown) for broadcasting warning or calling signals. This allows the wearer to be notified even if he does not have his audio device on his head.

The terminal may also include a wireless link dedicated to identification data or short message, type RFID, Sigfox, Lora (registered trademarks). This alternative network may in particular be used by the terminal to transmit alerts at long distances if the carrier is isolated and out of reach of the APPI network.

The terminal may also include a positioning circuit by satellite or terrestrial positioning (not shown). Thus, in the event of a problem, the precise positioning of the wearer of the terminal can be transmitted either to the other users of the APPI network, or to long distance via the fixed terrestrial networks mentioned above (for example, Sigfox, Lora).

Figure 3:
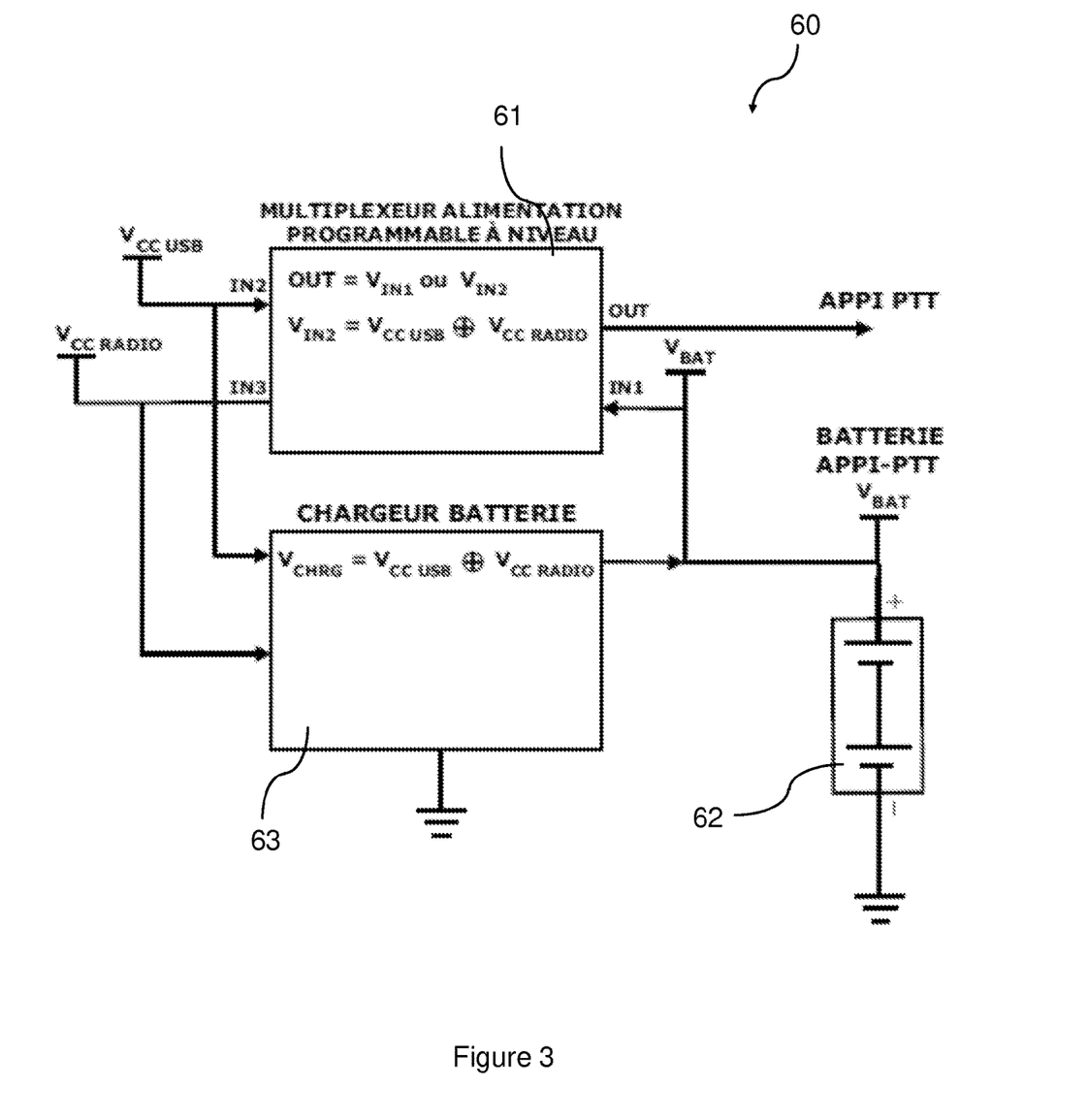
FIG. 3 represents, schematically, an electronic circuit of particular embodiments of the terminal object of the invention, FIG. 4 schematically represents an electronic circuit of particular embodiments of the terminal object of the invention

The terminal includes, in addition, an electronic circuit 60 as shown in FIG. 3, consists of a multiplexer 61 programmable power level allowing him to use the power source of the connected device (PMR or Wired intercom) as an external power source, this source allowing both the terminal to function, but also to recharge its battery 62 via a battery charger 63. Thus, even if the battery 62 of the terminal is discharged, the terminal can still function if it is connected to an external device providing a source of electrical energy.

The present invention relates to a method, a terminal and a wireless full-duplex voice communication system, as described, for example, in WO2013140070 A1, by application of the time division multiplexing technique and using a synchronous digital network, by example as described in FR3036914 A1. The terminal also allows, in the same box, the direct interconnection and the speaking on a PMR type network by manual or automatic action on a PTT integrated in the box, and/or on another radio network, GSM type for example. It applies, in particular, to the constitution of an autonomous radio communication network, multi-user, which includes both a "conference" (or "full-duplex" audio mode) for a certain number of users, and a long distance communication on other radio networks without the need for external communications mixing equipment. The applications are for mobile teams of people who need to communicate in wireless "conferencing" mode with each other while communicating on other networks with people who are more distant, or do not belong to the same team and who use more conventional systems as GSM phone, PMR or intercom.

The disclosed invention provides a significant improvement to the interconnections of various radio networks with a single, all-in-one portable enclosure system incorporating both:

- A radio creating a TDMA network without base in conference mode
- A programmable user interface with a control screen for sending a push button alert message,
- A connector for audio headphones,
- A connector for a vehicle intercom or one (or more) external radios making it possible to use the terminal of the invention as an alternator (PTT) even without the addition of energy by the terminal of the invention (empty battery) by analog mixing (different inputs of an Encoder-Decoder),
- A push button (PTT-Duplex) allowing the instantaneous or delayed triggering of the full-duplex radio source or the sending of predefined signals
- A second push button for triggering an external radio source, or sending predefined signals,
- A wireless connection, of the Bluetooth type for example, making it possible to connect several types of devices to external radio, GSM telephone, headset, or to connect environmental or physiological data sensors,
- A piezoelectric vibration device of the buzzer type for broadcasting warning signals,
- A motion sensor triggering an immobility alert with warning to team members,
- A wireless link dedicated to the identification data or short message, for example of the RFID type, Sigfox, Lora,
- A programmable selector allowing, for example, the choice of radio channels or sources to listen, the transmitters to be used or signals to be transmitted,
- A localization circuitry via satellite or terrestrial positioning,
- A sound reproduction system integrated into the case to provide voice communication without external headphone connection,
- A signal mixer from diverse sources including:
    - An audio headset directly connected to the single box by a wired or wireless link,
    - An external radio connected in wired or wireless mode,
    - A second internal radio or connected in wired or wireless mode
- A configurable audio and data flow management system allowing smooth and efficient communication for workers with several people in the team (INTRA communication), outside the team (EXT), or distant (PMR, Phone).

Thus, in the embodiment described, the portable communication-and-switching terminal is in a single box of the Multi-Radio-PTT type incorporating a wireless communication terminal of time-division multiplex radio communication without base on a single radio selectable in a frequency band, for audio communication in conference mode and "hands-free" on a standalone autonomous network between at least two wearers of equivalent or compatible devices, and integrating and/or allowing to connect directly other radio communication systems and means of connecting and switching audio signals.

This terminal:
- Allows the use by one person of a single audio headset equipment via connection (wired or wireless) for alternating or simultaneous voice communication on at least two different radio networks operating on different frequencies.
- Allows switching from one network to another by possible action on one or more selectors or pushbuttons, wired or wireless, or automatically by configuration, and/or mixing the reception or transmission signals from several sources of audio or radio.
- Allows, even when it is not powered electrically by a combination management of electrical states at rest (semi-conductor relay type with virtually no resistance at rest) to function as an alternating system (PTT) if a PMR type external radio is connected to it.
- The communication-and-switching system allows, thanks to internal sensors or connected by wire or wireless connection, to detect events or to measure physical-chemical values and to send data or warning signals to local or remote users.
- The communication-and-switching system makes it possible to operate the full-duplex radio part or simply to recharge its internal battery by drawing energy from the PMR-type radio connected to it.
- The communication-and-switching system manages the communication flows so as to make the communication flow smooth despite the incoming signals from several sources by the set of pushbuttons and a programmable management of the mixing of the input and output signals with prioritization, attenuations, delay or restoration of audio signals.

Preferably, this terminal is directly integrated in an PTT type box connected to an audio device, allowing either full-duplex audio and data communication without any user intervention once the communication is established, either, by action on one or several triggering buttons or automatically, the remote communication by at least one other means of radio communication (for example, PMR, GSM, vehicle intercom), internal or connected by wired or wireless connection.

Preferably, this terminal comports multiple radios means using different frequencies that can be integrated (e.g., Bluetooth, GSM, RFID, Lora, SigFox, Wifi) to ensure the continuous ongoing communication for audio, data, or sending warning signals (Sigfox, Lora).

Preferably, this terminal comprises, further, at least one sensor (for example: accelerometer, gyroscope, geographical position of the receiver) and/or internal functions to provide alerts or triggers sending messages to other terminals of the group or systems for receiving data by the digital communication circuit.

Preferably, this terminal comprises, in addition to the radio module for audio communication and the exchange of data with other terminals, at least one short-distance radio link of the "Bluetooth" type or equivalent operating in audio mode and/or in data mode, enabling exchanging data, allowing it to receive audio streams or data from sensors or equipment worn by the user or close to it.

Preferably, this terminal is configured to be connected by at least one short-distance wireless link to a heart rate sensor, a bottle gas pressure sensor, a body temperature sensor, an environmental temperature sensor, a gas sensor or an atmospheric sensor for potentially dangerous environment (for example, CMOS sensors for H2, CO, CO2, NOx) to communicate this information to the wearer and to the other terminals and/or to trigger alerts, the conditions for triggering the alerts being configurable Preferably, this terminal comprises a PTT button (PTT) for switching mode "duplex" or mode "PTT" for full-duplex hands-free communication.

Preferably, this terminal integrates a second PTT button (PTT) for switching from "speaking" to "listening" mode an external terminal of PMR type connected to it (wired or BT) communicating on another network using a different frequency, as illustrated in FIG. 3.

In embodiments, the terminal comports a connector allowing the connection of an external radio of PMR type.

With regard to the wireless communication of radio communication by time multiplexing without base on a single radio channel selectable in a frequency band, particular embodiments are described below.

In embodiments, the digital communication circuit of the terminal, by application of the time division multiplexing technique, is configured to transmit and receive digital data on a selected single channel, according to a periodic cycle common to all the terminals of the group. When he participates in the audio conference, he transmits his audio data to the other terminals of the group defined during the synchronization of the terminals of the group. When it receives communications from other connected radios (wired or wireless), it can switch from the audio conference network to one, or more, of the own network of said connected radios.

In embodiments, in addition to the radio module for audio communication and data exchange with other terminals, the terminal is provided with a radio link (Bluetooth or equivalent) to operate both in audio mode and in data mode. Thus, in addition to sensors or internal sensors (e.g., accelerometer, gyroscope, GPS receiver), these terminals may also be receiving streams of data or data from sensors or equipment carried by the user or close to him.

In embodiments, the terminal can be connected by this link to a heart rate sensor, body temperature sensor, environmental temperature sensors, gases or potentially hazardous atmospheres (for example, sensors for H2, CO, CO2, NOx) to communicate this information to the bearer and the other terminals and/or to trigger alerts.

In embodiments, the terminal incorporates radio circuits dedicated to long distance communication (e.g., Type Lora, Sigfox trademarks) and low speed for sending data to the other terminals or remote receiving stations for data analysis and/or trigger alerts.

Preferably, the conditions for triggering the alerts are configurable.

Preferably, the terminal integrates information function about the connected team members. Indeed, in a group of people who do not necessarily see each other and who talk together but not continuously, it can be important for everyone to know who is online and receive a voice alert if one of them disconnects. So if people do not speak, we must be able to detect that they are still "online".

For the moment, during the radio connection to another APPI terminal, the wearer of a terminal receives the "connected" audio message (available in different languages). He knows that he is part of the group. In a group of three persons example, each ONE hears "connected" as soon as it is connected to at least one other person.

If person A disconnects, he hears "disconnected" but the others (people B and C) hear nothing because they are still connected together.

As a result, the connection-disconnection indication function of each (group accession) can only be used as an indicator of "line break" in the case where there are only two people (since the loss of a fact loses the only established communication).

For example, for three people in a "crane operator" application, it is important that the crane operator, who does not see the crane chief or the slinger, both on the ground, be informed that the crane operator is no longer "In line", and, therefore, can no longer give him a signal to stop the rotation of the crane arm or descent of the load. Everyone's safety may be at stake. In the "fully wired" version, the wire link is often cut by crane chief's move as he has to go around the crane, then a warning is given to the crane operator, who stops all crane movement.

In embodiments that solve this problem, the terminal is put in operating mode called "SafeLine". In this mode of operation, the radio link between each of the stations is controlled by the reception level of each speaker and the good reception of the synchronization data (since there is no speech data). In addition, the terminal is able to detect if a headset, wired or not, is connected by two specific ways:

Wired case: the audio-box radio headphone connection socket includes a cable with resistance specific to the type of audio headset that validates its presence and detects its possible disconnection by a circuit measuring the voltage across the two conductors (go-return). If the headset connector is removed, the terminal detects it.

Wireless case (Bluetooth): the breaking of the Bluetooth link is detected by the protocol of communication itself. The loss of the Bluetooth headset (for example, no battery, no power, out of range) is then detected by the terminal.

The third parties are warned of "who is in line" with a voice message, in addition to a symbol that appears on the terminal's control screen, indicating that some other terminal is connected: as an example, the user of the terminal "A" team of three interconnected terminals, would hear "Terminal B connected" and "Terminal C connected".

At a regular time interval (configurable by configuration), the terminal checks that users B and C are still connected. If not, it plays the corresponding voice message ("Terminal X disconnected").

As can be understood from reading the above description, the present invention aims in particular at a terminal which offers multi-speaker hands-free full-duplex communication in a small geographical area on a single radio channel without any existing infrastructure, and which makes it possible to mixing full-duplex local network communications with half-duplex communications via a PMR to extend this conference over greater distances, and also mix this conference over long distances with a mobile phone linked to the terminal via a Bluetooth connection. From this single terminal to which can be connected headphones, the user has access to multiple simultaneous audio communications on different networks.

The object of the present invention therefore aims in particular at a terminal dedicated to local full-duplex communication which can be interconnected (by audio mixing) with communications from other terminals of the market (PMR and/or mobile phones), the user of said terminal can communicate with all of these networks according to his choice (pressing a push button and setting, for example).

This terminal includes a TDMA full-duplex audio communication system without existing infrastructure (without GSM or Antares type terrestrial network), digital or analog audio inputs/outputs to connect PMR type terminals, possibly a Bluetooth connection to connect a telephone mobile in audio mode, and an audio mixer for mixing all these internal and external audio signals (according to the user's choices, especially with the support of buttons on the terminal).

In summary, the present invention provides a terminal with TDMA Full-duplex radio, without infrastructure, and interconnections with external audio PMR terminals (the terminal does not include a PMR) and/or mobile phones to enable users to be connected simultaneously to up to three communication groups (the local full-duplex group, the PMR group and the mobile/long-distance call group).

In embodiments, the terminal object of the invention is directly included in a PMR. In other words, it integrates, in a PMR, the full-duplex communication without infrastructure on another network with the same principles of mixing, priority signals according to setting/user actions, as described above. Compared with other embodiments described above, in this embodiment, the terminal object of the invention is not connected to an external PMR by a connector, but this terminal directly includes this PMR.

The invention claimed is:

1. Terminal for communicating on at least two independent radio networks, characterized in that it comprises, in a single housing:
   Communication means by time multiplexing on a single radio channel, TDMA type full-duplex, for audio communication in "conference" and "hands-free" mode on a first local autonomous network without infrastructure,
   Access means for half-duplex audio communication on a second autonomous network, independent from the first full-duplex network,
   A connection to a microphone and a loudspeaker,
   A wireless connection for a cellular network,
   At least one pushbutton for switching between the first network, the second network and the cellular telephone network allowing thereby selecting communication over one of the first, second and cellular networks, and
   An electronic mixer configured for mixing audio signals of Codec type, and including several inputs configured to receive an audio signal from said microphone and from each one of said first, second and cellular networks, said mixer further includes several outputs configured to output an audio signal to said loudspeaker and to each one of said first, second and cellular networks, said mixer being configured to mix the half-duplex audio signal from the second autonomous network and the full-duplex audio signal from the first local autonomous network, and to provide a mixed audio signal to one of the first, second and cellular networks depending on selection of said pushbutton.

2. Terminal according to claim 1, which comprises means for audible signaling of the cutoff and/or establishment of a synchronization data communication between said terminal and a peer terminal.

3. Terminal according to claim 1 which comprises means for audible signaling of the cut and/or the establishment of a communication between a peer terminal, a microphone and a speaker of said terminal counterpart.

4. Terminal according to claim 1, which comprises means for mixing input and output signals with prioritization, attenuation, timing or recovery of audio signals.

5. Terminal according to claim 1, which comprises a codec providing functions of pre-amplification, audio mixing, audio multiplexing, digitizing signals, filtering and post-amplification.

6. Terminal according to, claim 1, which comprises at least one PMR type external radio input and a cell phone input.

7. The terminal according to claim 6 which includes priority setting means configured to give a different priority for each of the different types of communication.

8. Terminal according to, claim 1, which comprises attenuation means, in each loudspeaker, of sound signals from a lower priority communication when a sound signal of a higher priority communication is received and broadcast in each speaker.

9. Terminal according to, claim 1, which comprises a means of audible signaling of the cut of the listening of a less priority communication in progress between said terminal and a peer terminal when the peer terminal receives a communication more priority, maintaining the connection and synchronization between terminals.

10. Terminal according to claim 9, which comprises a means of detecting end of communication more priority and recovery of a communication less priority.

11. Terminal according to, claim 1, which comprises means for retransmission of signals from one network to another.

12. Terminal according to claim 1, which comprises means for receiving an alert signal, said alert signal being broadcast by each speaker, regardless of the state of the terminal and the priority level of ongoing communications.

13. Terminal according to claim 1, which comprises an access to at least one internal sensor or connected by wire or wireless connection, for detecting events or measuring physical-chemical values, at least one communication mean configured to send data or alert signals to other terminals, depending on the events or the sensed measurements.

14. Terminal according to claim 1, which comprises a headset having the microphone and the speaker.

15. Terminal according to claim 1, which comprises a connector for connection to an external PMR.

16. Terminal according to claim 15, which comprises at least one multiplexer for, even when not electrically powered, by a combination management of electrical states at rest of at least one multiplexer, operate as an alternating system ("PTT") if an external PMR type radio is connected to it.

17. Terminal according to claim 15, which comprises means for recharging an internal battery by taking energy from a PMR type radio connected thereto.

18. Terminal according to claim 1, which is included in a PMR.

* * * * *